(12) United States Patent
Liu et al.

(10) Patent No.: US 11,210,534 B2
(45) Date of Patent: Dec. 28, 2021

(54) METHOD FOR POSITION DETECTION, DEVICE, AND STORAGE MEDIUM

(71) Applicant: BAIDU ONLINE NETWORK TECHNOLOGY (BEIJING) CO., LTD., Beijing (CN)

(72) Inventors: Mingjian Liu, Beijing (CN); Yucheng Wang, Beijing (CN); Xun Sun, Beijing (CN); Shufu Xie, Beijing (CN); Yuqiang Zhai, Beijing (CN); Hao Wang, Beijing (CN); Tian Xia, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 323 days.

(21) Appl. No.: 16/561,971

(22) Filed: Sep. 5, 2019

(65) Prior Publication Data
US 2020/0082183 A1    Mar. 12, 2020

(30) Foreign Application Priority Data

Sep. 7, 2018    (CN) .......................... 201811044487.8

(51) Int. Cl.
*G06K 9/00* (2006.01)
*G05D 1/00* (2006.01)
*G05D 1/02* (2020.01)

(52) U.S. Cl.
CPC ....... *G06K 9/00805* (2013.01); *G05D 1/0088* (2013.01); *G05D 1/0251* (2013.01);
(Continued)

(58) Field of Classification Search
CPC ........... G06K 9/00805; G06K 9/00798; G06K 2209/21; G06K 9/00201; G05D 1/0088;
(Continued)

(56) References Cited

U.S. PATENT DOCUMENTS 6,546,118 B1 *    4/2003    Iisaka ................ G06K 9/00798
                                                            340/907
6,977,630 B1 *   12/2005    Donath ..................... B60R 1/00
                                                            345/7
(Continued)

FOREIGN PATENT DOCUMENTS

CN    103559791 A    2/2014
CN    105224908 A    1/2016
(Continued)

OTHER PUBLICATIONS

Stefan Ernst et al., "Camera Calibration for Lane and Obstacle Detection", 6 pages.
(Continued)

*Primary Examiner* — Mahendra R Patel
(74) *Attorney, Agent, or Firm* — Fay Sharpe LLP

(57) ABSTRACT

Embodiments of the present disclosure disclose a method for position detection, a device, and a storage medium. The method includes: detecting a first lane line in a current image captured by a camera; performing an optimization on an initial transformation matrix reflecting a mapping relationship between a world coordinate system and a camera coordinate system based on a detection result of the first lane line; and obtaining a first 3D coordinate of a target object in the current image according to a transformation matrix optimized, and determining an ultimate 3D coordinate of the target object according to the first 3D coordinate.

19 Claims, 4 Drawing Sheets

(52) U.S. Cl.
CPC ....... *G05D 1/0274* (2013.01); *G06K 9/00798* (2013.01); *G05D 2201/0213* (2013.01)

(58) Field of Classification Search
CPC ............... G05D 1/0251; G05D 1/0274; G05D 2201/0213; G06T 7/80; G06T 2207/30256; G06T 2207/30261; G06T 7/73; G06T 2207/30252; B60R 1/00; B60Q 2300/41; B60Q 2300/43
USPC ........................................................ 382/154
See application file for complete search history.

(56) References Cited

U.S. PATENT DOCUMENTS

| | | | | |
|---|---|---|---|---|
| 9,555,803 | B2* | 1/2017 | Pawlicki | G01S 11/12 |
| 10,282,914 | B1* | 5/2019 | Tran | G01G 19/44 |
| 10,291,904 | B2* | 5/2019 | Finn | G01C 25/00 |
| 10,489,965 | B1* | 11/2019 | Cregan | H04W 4/33 |
| 10,694,175 | B2* | 6/2020 | Bovyrin | B60W 30/02 |
| 2003/0030546 | A1* | 2/2003 | Tseng | G06K 9/00805 |
| | | | | 340/425.5 |
| 2009/0067675 | A1* | 3/2009 | Tan | G01S 13/867 |
| | | | | 382/104 |
| 2010/0080467 | A1* | 4/2010 | Sakurai | G06K 9/4633 |
| | | | | 382/195 |
| 2011/0115912 | A1* | 5/2011 | Kuehnle | G06K 9/00798 |
| | | | | 348/148 |
| 2011/0205340 | A1* | 8/2011 | Garcia | G01S 17/894 |
| | | | | 348/46 |
| 2013/0207966 | A1* | 8/2013 | Chu | G06T 17/00 |
| | | | | 345/419 |
| 2014/0129081 | A1* | 5/2014 | Ehlgen | B60Q 1/115 |
| | | | | 701/36 |
| 2015/0049193 | A1* | 2/2015 | Gupta | G03B 43/00 |
| | | | | 348/148 |
| 2015/0161456 | A1* | 6/2015 | Chevalley | H04N 17/002 |
| | | | | 348/148 |
| 2016/0225121 | A1* | 8/2016 | Gupta | G06T 3/00 |
| 2016/0243704 | A1* | 8/2016 | Vakanski | B25J 9/1697 |
| 2017/0302909 | A1* | 10/2017 | Finn | G01C 25/00 |
| 2018/0165822 | A1* | 6/2018 | Uliyar | G06K 9/00798 |
| 2019/0056422 | A1* | 2/2019 | Park | A63F 13/212 |
| 2019/0066334 | A1* | 2/2019 | Gu | G06T 7/80 |
| 2019/0156128 | A1* | 5/2019 | Zhang | G08G 1/167 |
| 2021/0199437 | A1* | 7/2021 | Breed | G01C 21/165 |

FOREIGN PATENT DOCUMENTS

| | | |
|---|---|---|
| CN | 106384085 A | 2/2017 |
| EP | 2562681 A1 | 2/2013 |
| JP | H620189 A | 3/1994 |
| JP | H777431 A | 3/1995 |
| JP | H793693 A | 4/1995 |
| JP | 2003329411 A | 11/2003 |
| JP | 2010218226 A | 9/2010 |
| JP | 2011215063 A | 10/2011 |
| JP | 2012075060 A | 4/2012 |
| JP | 2018116369 A | 7/2018 |

OTHER PUBLICATIONS

Partial European Search Report for Application No. 19192032.1, dated Mar. 3, 2020, 13 pages.
Office Action for Chines Application No. 201811044487.8, dated May 7, 2020, 15 pages.
Xu Maopeng, "Research and Implementation of Lane Detection System", A Master Thesis Submitted to University of Electronic Science and Technology of China, 81 pages. Abstract.
Extended European Search Report for EP Application No. 19192032.1, dated Aug. 10, 2020, 18 pages.
Office Action for Japanese Application No. 2019155990, dated Sep. 9, 2020, 8 pages.
Hendrik Weigel et al., "Simultaneous Estimation of Vehicle Dynamics and Lane Features for Road Safety Applications", 12th International Conference on Information Fusion, Seattle, WA, US, Jul. 6-9, 2009, 8 pages.
J. Goldbeck et al., "Lane Following Combining Vision and DGPS", Image and Vision Computing 18 (2000), pp. 425-433.
Yuquan Xu et al., "3D Point Cloud Map Based Vehicle Localization Using Stereo Camera", IEEE Intelligent Vehicles Symposium, Jan. 31, 2017, 7 pages.

* cited by examiner

METHOD FOR POSITION DETECTION, DEVICE, AND STORAGE MEDIUM

CROSS-REFERENCE TO RELATED APPLICATION

The present application is based upon and claims priority to Chinese Patent Application No. 201811044487.8, filed on Sep. 7, 2018, the entirety contents of which are incorporated herein by reference.

FIELD

The present disclosure relates to a field of unmanned vehicle technology, and more particularly, to a method for position detection, a device, and a storage medium.

BACKGROUND

In the related art, a vision-based detection algorithm is adopted in an unmanned vehicle system to detect a 3D position of an obstacle.

Specifically, a z-axis coordinate value (i.e., a coordinate value in z axis) of the obstacle is first calculated according to a formula of: $h/H=f/z$, where z represents the z-axis coordinate value of the obstacle, f represents a focal length of a camera mounted on the unmanned vehicle, h represents a height value of the obstacle in the image captured by the camera, and H represents an actual height value of the obstacle. Then, an x-axis coordinate value and a y-axis coordinate value are obtained according to the z-axis coordinate value, then a 3D position coordinate of obstacle is obtained.

Since a value of H in the above solution is obtained according to a pre-trained machine model, making an accuracy is low, the accuracy of the 3D position coordinate of the obstacle is reduced.

SUMMARY

Embodiments of the present disclosure provide a method for position detection, a device, and a storage medium, to improve an accuracy of detecting a 3D position coordinate of a target object in an unmanned vehicle system.

Embodiments of the present disclosure provide a method for position detection. The method includes: detecting a first lane line in a current image captured by a camera; performing an optimization on an initial transformation matrix reflecting a mapping relationship between a world coordinate system and a camera coordinate system based on a detection result of the first lane line; and obtaining a first 3D coordinate of a target object in the current image according to a transformation matrix optimized, and determining an ultimate 3D coordinate of the target object according to the first 3D coordinate.

Embodiments of the present disclosure provide an electronic device. The electronic device includes a memory, a processor; and computer programs stored in the memory and executable by the processor, in which when the processor executes the computer programs, a method for position detection is performed, and the method may include: detecting a first lane line in a current image captured by a camera; performing an optimization on an initial transformation matrix reflecting a mapping relationship between a world coordinate system and a camera coordinate system based on a detection result of the first lane line; and obtaining a first 3D coordinate of a target object in the current image according to a transformation matrix optimized, and determining an ultimate 3D coordinate of the target object according to the first 3D coordinate.

Embodiments of the present disclosure provide a computer readable storage medium, storing computer programs thereon, in which when the computer programs are executed by a processor, a method for position detection is performed, and the method may include: detecting a first lane line in a current image captured by a camera; performing an optimization on an initial transformation matrix reflecting a mapping relationship between a world coordinate system and a camera coordinate system based on a detection result of the first lane line; and obtaining a first 3D coordinate of a target object in the current image according to a transformation matrix optimized, and determining an ultimate 3D coordinate of the target object according to the first 3D coordinate.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

Embodiment 1

Figure 1:
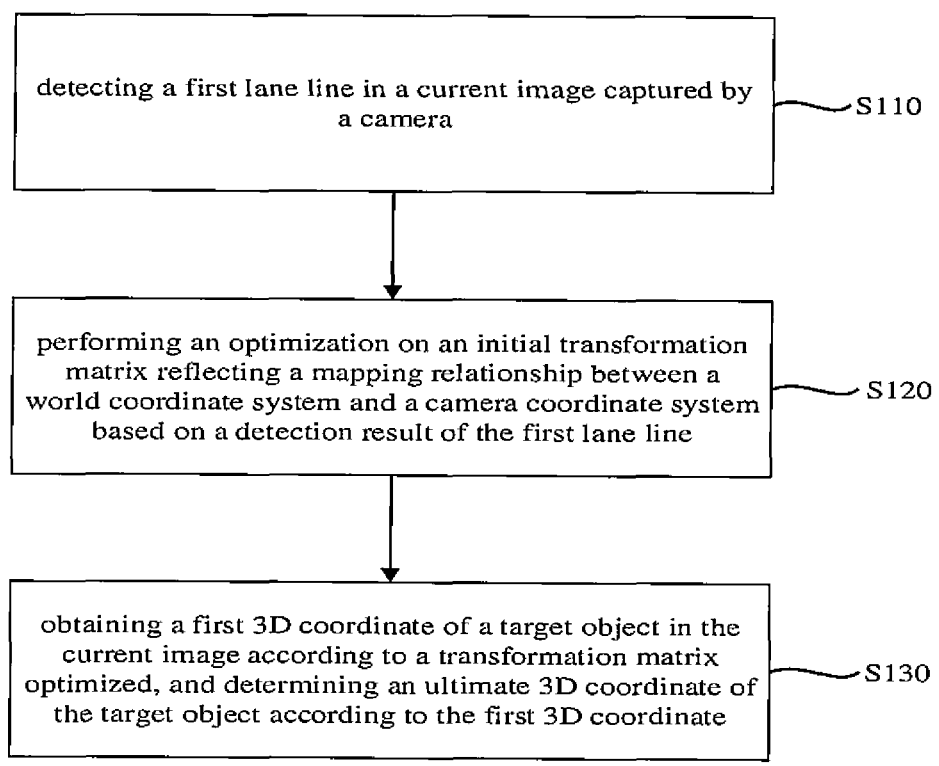
FIG. 1 is a flow chart of a method for position detection according to Embodiment 1 of the present disclosure.

FIG. 1 is a flow chart of a method for position detection according to Embodiment 1 of the present disclosure. The embodiment may be applicable to a detection of a 3D position coordinate of a target object in an unmanned vehicle system. The method may be executed by an apparatus for position detection, and the apparatus may be implemented in hardware and/or software, and generally may be integrated in a device with a position detection function, the device may be a mobile terminal, an on-vehicle device and other electronic devices. As illustrated in FIG. 1, the method specifically includes followings.

At block S110, a first lane line in a current image captured by a camera is detected.

Specifically, images in front of a vehicle are captured continuously by an on-vehicle camera during a driving process of the unmanned vehicle. When the camera captures a current image, a first lane line in the current image is detected to obtain a coordinate of each point in the first lane line or a pitch angle corresponding to a vanishing point of the first lane line.

At block S120, an optimization on an initial transformation matrix reflecting a mapping relationship between a world coordinate system and a camera coordinate system is performed based on a detection result of the first lane line.

The transformation matrix may be a matrix reflecting a mapping relationship between the world coordinate system and the camera coordinate system. A coordinate of a point mapping to the camera coordinate system may be obtained through the transformation matrix multiplying the coordinate of the point in the world coordinate system.

Alternatively, performing the optimization on the initial transformation matrix reflecting the mapping relationship between the world coordinate system and the camera coordinate system based on the detection result of the first lane line may be implemented by performing acts of: projecting a lane line on a map (the lane line on the map and at a location of the current image being captured), to the current image according to the initial transformation matrix reflecting the mapping relationship between the world coordinate system and the camera coordinate system, so as to obtain a second lane line; and performing the optimization on the initial transformation matrix according to a position of the first lane line in the current image and a position of the second lane line in the current image, to make a distance between a new second lane line obtained by re-projecting the lane line in the map to the current image according to the transformation matrix optimized and the first lane line smaller than a distance between the second lane line and the first lane line.

The map is built based on the world coordinate system. Projecting the lane line in the map to the current image to obtain the second lane line may be implemented by performing acts of: projecting each point of the lane line in the map to a pixel of the map according to the initial transformation matrix corresponding to the map between the world coordinate system and the camera coordinate system, forming the second lane line by all of the pixels projected. Exemplarily, projecting the lane line in the map to the current image to obtain the second lane line may be implemented by a formula of:

$$\begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & t \\ 0^T & 1 \end{bmatrix} \begin{bmatrix} X \\ Y \\ Z \\ 1 \end{bmatrix} =$$

$$\begin{bmatrix} l_1 & l_2 & l_3 & l_4 \\ l_5 & l_6 & l_7 & l_8 \\ l_9 & l_{10} & l_{11} & l_{12} \end{bmatrix} \begin{bmatrix} X \\ Y \\ Z \\ 1 \end{bmatrix} = P \begin{bmatrix} X \\ Y \\ Z \\ 1 \end{bmatrix},$$

where u and v represent coordinates of the pixels in the image, X, Y, and Z represents coordinates of the world coordinate system, and P represents the transformation matrix between the world coordinate system and the camera coordinate system.

Specifically, each point of the lane line in the map has the coordinate based on the world coordinate system, the coordinate of the each point of the lane line in the map is transformed to the coordinate in the image based on the camera coordinate system using the initial transformation matrix between the world coordinate system and the camera coordinate system, then the each point of the lane line in the map is projected to the pixel of the image and finally, the second lane line is formed by the respective pixels projected. After obtaining the second lane line, the initial transformation matrix may be optimized according to the position of the first lane line in the current image and the position of the second lane line in the current image.

Alternatively, performing the optimization on the initial transformation matrix according to the position of the first lane line in the current image and the position of the second lane line in the current image may be implemented by performing acts of: determining shortest distances from a preset number of points of the first lane line to the second lane line according to the position of the first lane line in the current image and the position of the second lane line in the current image, and determining a first loss function based on the shortest distances; performing at least one adjustment on the position of the second lane line to make a value of the first loss function decrease; and obtaining the optimized transformation matrix reflecting the mapping relationship between the world coordinate system and the camera coordinate system according to a position of a new second lane line obtained after the at least one adjustment in the current image and a position a lane line in the world coordinate system.

The position of the first lane line in the current image may be represented by the coordinates of all of the points formed the first lane line, and the position of the second lane line in the current image may be represented by the coordinates of all of the points formed the second lane line. The implementation of determining the first loss function based on the shortest distances may be: summing the shortest distances from the preset number of points of the first lane line to the second lane line. The first loss function is expressed by the formula of: $J=\text{sum}((x1-x2)^2+(y1-y2)^2)^{1/2}$, where (x1, y1) represents a point of the first lane line, (x2, y2) represents a point on the second lane line with the shortest distance from (x1, y1), $((x1-x2)^2+(y1-y2)^2)^{1/2}$ represents a distance between the two points, that is the shortest distances from (x1, y1) to the second lane line, and sum represents a summation of the respective shortest distances.

Performing at least one adjustment on the position of the second lane line to make a value of the first loss function decrease may be implemented by performing acts of: firstly, performing an adjustment on the coordinate of the each point of the second lane line according to a preset step size, specifically, performing the adjustment on the each point on the second lane line with the shortest distances from the preset number of points of the first lane line; adding the coordinate of the each point to be adjusted to the preset step size or subtracting the coordinate of the each point to be adjusted from the preset step size during the adjustment; after performing the adjustment on the coordinate of the each point of the second lane line, reforming the new second lane line by the adjusted points; then, redetermining the value of the first loss function according to the position of the first lane line and the position of the new second lane line; next judging whether the redetermined value of the first loss function increases or decreases, in which when the value increases, the adjustment is invalid, a backward adjustment is performed on the coordinate of each point of the second lane line according to the preset step size (that is, when the previous invalid adjustment is adding the step size, the present adjustment is subtracting the step size; when the previous invalid adjustment is subtracting the step size, then the present adjustment is adding the step size); when the value decreases, the adjustment is valid, performing the adjustment on the second 3D coordinate in a same direction according to the preset step size (that is, when the previous valid adjustment is added to the step size, the adjustment is also added to the step size, if the previous valid adjustment is subtracting the step size, the adjustment is unchanged from subtracting the step size). When a number of above adjustments reaches a preset number of iterations or the value of the loss function is smaller than a preset threshold, the adjustment is stopped. The coordinates of all of the points obtained after an ultimate adjustment form an ultimate new second lane line. The transformation matrix obtained according to the new second lane line and the position of the lane line in the world coordinate system is the optimized transformation matrix.

At block S130, a first 3D coordinate of a target object in the current image is obtained according to a transformation matrix optimized, and an ultimate 3D coordinate of the target object is determined according to the first 3D coordinate.

Specifically, after obtaining the transformation matrix optimized, the first 3D coordinate of the target object is obtained according to a 3D coordinate of the target object in the current image and the transformation matrix optimized.

Alternatively, obtaining the first 3D coordinate of the target object in the current image according to the transformation matrix optimized may be implemented by performing an act of: performing a reverse projection on the 2D coordinate of the target object in the current image to the world coordinate system according to an inverse matrix of the transformation matrix optimized, to obtain the first 3D coordinate of the target object.

The 2D coordinate may be the 2D coordinate of the point on a bottom edge of a 2D frame of the target object, the corresponding first 3D coordinate is the 3D coordinate of a landing point of the target object (i.e., the point where the target object touches the ground). The 2D frame may be obtained automatically according to an existing algorithm. Specifically, the inverse matrix of the transformation matrix is multiplied by the 2D coordinate of the target object in the current image, the first 3D coordinate of the target object is obtained. Exemplarily, the first 3D coordinate may be obtained by a formula of:

$$\begin{bmatrix} X \\ Y \\ Z \\ 1 \end{bmatrix} = P_{new}^{-1} \begin{bmatrix} u \\ v \\ 1 \end{bmatrix},$$

where u and v represent coordinates of the pixels in the image, X, Y, and Z represents coordinates of the world coordinate system, and $P_{new}^{-1}$ represents the inverse matrix of the optimized transformation matrix.

Alternatively, determining the ultimate 3D coordinate of the target object according to the first 3D coordinate includes: determining the first 3D coordinate as the ultimate 3D coordinate of the target object; or comparing the first 3D coordinate with a second 3D coordinate of the target object obtained according to a preset detection algorithm; in response to the first 3D coordinate being inconsistent with the second 3D coordinate, correcting the second 3D coordinate according to the first 3D coordinate, and determining the second 3D coordinate corrected as the ultimate 3D coordinate of the target object.

The preset detection algorithm may be an existing vision-based detection algorithm. Alternatively, correcting the second 3D coordinate according to the first 3D coordinate, and taking the second 3D coordinate corrected as the ultimate 3D coordinate of the target object may be implemented by performing acts of: determining a second loss function based on a difference between the second 3D coordinate and the first 3D coordinate; performing the at least one adjustment on the second 3D coordinate to make a value of the second loss function decrease; and determining the second 3D coordinate obtained after the at least one adjustment as the ultimate 3D coordinate of the target object.

The difference between the second 3D coordinate and the first 3D coordinate may be the difference between the second 3D coordinate and the first 3D coordinate of the landing point of the target point, and may be obtained by the formula of: $d=((x1-x2)^2+(y1-y2)^2+(z1-z2)^2)^{1/2}$, where (x1, y1, z1) represents the first 3D coordinate of one of landing points of the target object, (x2, y2, z2) represents the second 3D coordinate of this landing point of the target object, and d represents the difference between the second 3D coordinate and the first 3D coordinate. The second loss function may be determined in a manner of summing the differences between the second 3D coordinates and the first 3D coordinates of the preset number of landing points of the target object.

Specifically, performing the at least one adjustment on the second 3D coordinate to make a value of the second loss function decrease may be implemented by performing acts of: performing the adjustment on the second 3D coordinate according to the preset step size; adding the coordinate of the each point to be adjusted and the preset step size, or subtracting the preset step size from the coordinate of the each point to be adjusted during the adjustment; redetermining the value of the second loss function after the adjustment; judging whether the value of the second loss function redetermined increases or decreases, in which when the value increases, the adjustment is invalid, the backward adjustment may be performed on the second 3D coordinate according to the preset step size (that is, when the previous invalid adjustment is adding the step size, then present adjustment is subtracting the step size; when the previous invalid adjustment is subtracting the step size, then the present adjustment is adding the step size); when the value decreases, the second 3D coordinate is readjusted according to the preset step size (that is, when the previous invalid adjustment is adding the step size, the present adjustment is also adding the step size, when the previous invalid adjustment is subtracting the step size, the present adjustment is still subtracting the step size). When the number of above adjustments reaches the preset number of iterations or the value of the second loss function is smaller than the preset threshold, the adjustment is stopped. Finally, the second 3D coordinate obtained after the adjustment is determined as the ultimate 3D coordinate of the target object.

Alternatively, the method further includes: obtaining a 3D position coordinate of a positioning element in the current image after each adjustment for the second 3D coordinate; in response to a distance between the positioning element and the camera being greater than a distance between the target object and the camera, determining whether the second 3D coordinate after the adjustment is smaller than the 3D position coordinate of the positioning element, in which, if the second 3D coordinate after the adjustment is smaller than the 3D position coordinate of the positioning element, the adjustment is valid; otherwise, the adjustment is invalid, and a reverse adjustment is performed on the second 3D coordinate; and in response to the distance between the positioning element and the camera being smaller than the distance between the target object and the camera, determining whether the second 3D coordinate after the adjustment is greater than the 3D position coordinate of the positioning element, in which, if the adjustment is greater than the 3D position coordinate of the positioning element, the adjustment is valid; otherwise, the adjustment is invalid, and the reverse adjustment is performed on the second 3D coordinate.

The positioning element may include at least one of a traffic sign, a street light, and a telephone pole. In the embodiment, when the positioning element in the image is above the target object, the distance between the positioning element and the camera is greater than the distance between the target object and the camera; when the positioning element is under the target object, the distance between the positioning element and the camera is smaller than the distance between the target object and the camera. Comparing the adjusted second 3D coordinate with the 3D coordinate of the positioning element may be comparing vertical coordinates of the two 3D coordinates. In the embodiment, an accuracy of a 3D coordinate adjustment may be improved by adjusting the second 3D coordinate with the positioning element as a reference.

According to a technical solution of the embodiment, the first lane line in the current image captured by the camera is detected first, then the optimization is performed on the initial transformation matrix reflecting the mapping relationship between the world coordinate system and the camera coordinate system based on the detection result of the first lane line; and the first 3D coordinate of the target object in the current image according to the transformation matrix optimized is obtained, and the ultimate 3D coordinate of the target object is determined according to the first 3D coordinate. With the method for position detection provided by embodiments of the present disclosure, the first 3D coordinate of the target object in the image is obtained using the optimized transformation matrix, and then the ultimate 3D coordinate of the target object is determined according to the first 3D coordinate. The method may improve the accuracy of detecting the 3D position coordinate of the target object such as an obstacle in the unmanned vehicle system.

Embodiment 2

Figure 2:
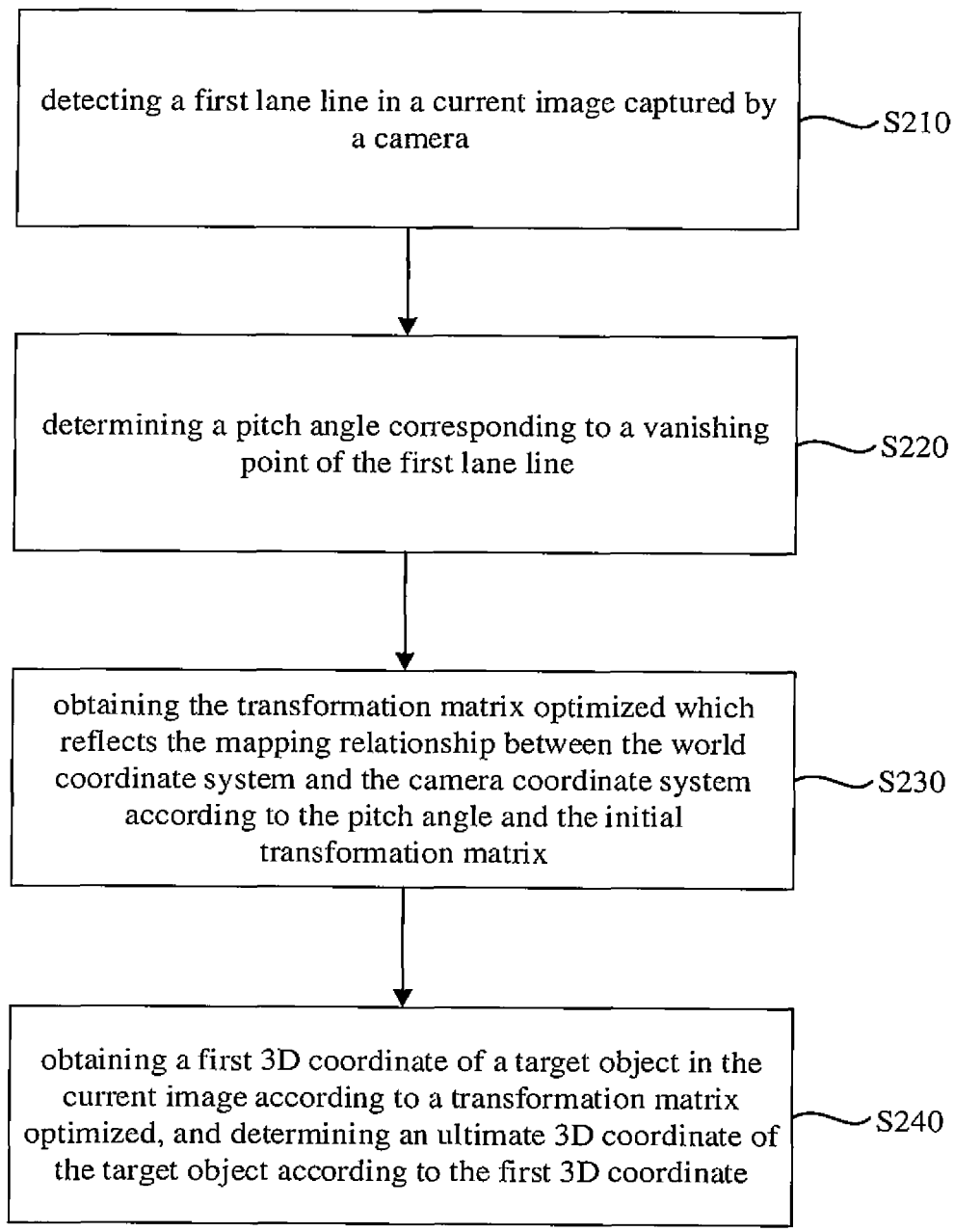
FIG. 2 is a flow chart of a method for position detection according to Embodiment 2 of the present disclosure.

FIG. 2 is a flow chart of a method for position detection according to Embodiment 2 of the present disclosure. On the basis of the above embodiment, performing the optimization on the initial transformation matrix reflecting the mapping relationship between the world coordinate system and the camera coordinate system based on the detection result of the first lane line may be implemented by performing acts of: determining a pitch angle corresponding to a vanishing point of the first lane line, in which the pitch angle refers to an angle between an optical axis of the camera and a ground plane; and obtaining the transformation matrix optimized which reflects the mapping relationship between the world coordinate system and the camera coordinate system according to the pitch angle and the initial transformation matrix. As illustrated in FIG. 2, the method specifically includes followings.

At block S210, a first lane line in a current image captured by a camera is detected.

At block S220, the pitch angle corresponding to the vanishing point of the first lane line is determined.

The pitch angle refers to the angle between the optical axis of the camera and the ground plane. The vanishing point of the first lane line may be an intersection of two lane lines.

Alternatively, the pitch angle corresponding to the vanishing point of the first lane line may be determined by a formula of: $Y=\tan(pitch)*fy+cy$, where Y represents a vertical axis coordinate value corresponding to the vanishing point of the first lane line; pitch represents the pitch angle corresponding to the vanishing point of the first lane line; fy represents a focal length of the camera, and cy represents a size of the pixel on a sensor unit of the camera.

At block S230, the transformation matrix optimized which reflects the mapping relationship between the world coordinate system and the camera coordinate system is obtained according to the pitch angle and the initial transformation matrix.

Specifically, a pitch angle element in the transformation matrix between the world coordinate system and the camera coordinate system corresponding to an initial map is replaced with the pitch angle corresponding to the vanishing point of the first lane line to obtain the optimized transformation matrix.

Alternatively, obtaining the transformation matrix optimized which reflects the mapping relationship between the world coordinate system and the camera coordinate system according to the pitch angle and the initial transformation matrix may be implemented by performing acts of: denoising and smoothing the pitch angle corresponding to the vanishing point of the first lane line with a preset filtering algorithm according to the pitch angle corresponding to the vanishing point of a lane line in a previous image captured before the current image; and obtaining the transformation matrix optimized which reflects the mapping relationship between the world coordinate system and the camera coordinate system according to the pitch angle subjected to the denoising and the smoothing and the initial transformation matrix.

The preset filtering algorithm may be Kalman filtering algorithm or Histogram smoothing filtering algorithm and the like. Specifically, after obtaining a plurality of pitch angles corresponding to the vanishing points of the lane line in the previous image, the pitch angle corresponding to the vanishing point of the first lane line in the current image is denoised and smoothed with the preset filtering algorithm according to the plurality of previous pitch angles, the pitch angle element in the transformation matrix between the world coordinate system and the camera coordinate system corresponding to the initial map is replaced with the denoised and smoothed pitch angle to obtain the transformation matrix optimized between the world coordinate system and the camera coordinate system.

At block S240, the first 3D coordinate of the target object in the current image is obtained according to the transformation matrix optimized, and the ultimate 3D coordinate of the target object is determined according to the first 3D coordinate.

According to the technical solution of the embodiment, the optimized transformation matrix reflecting the mapping relationship between the world coordinate system and the camera coordinate system is obtained according to the pitch angle and the initial transformation matrix, the first 3D coordinate of the target object in the current image is obtained according to the optimized transformation matrix, and the ultimate 3D coordinate of the target object is determined according to the first 3D coordinate. The solution may improve the accuracy of detecting the 3D position coordinate of an obstacle in an unmanned vehicle system.

Figure 3:
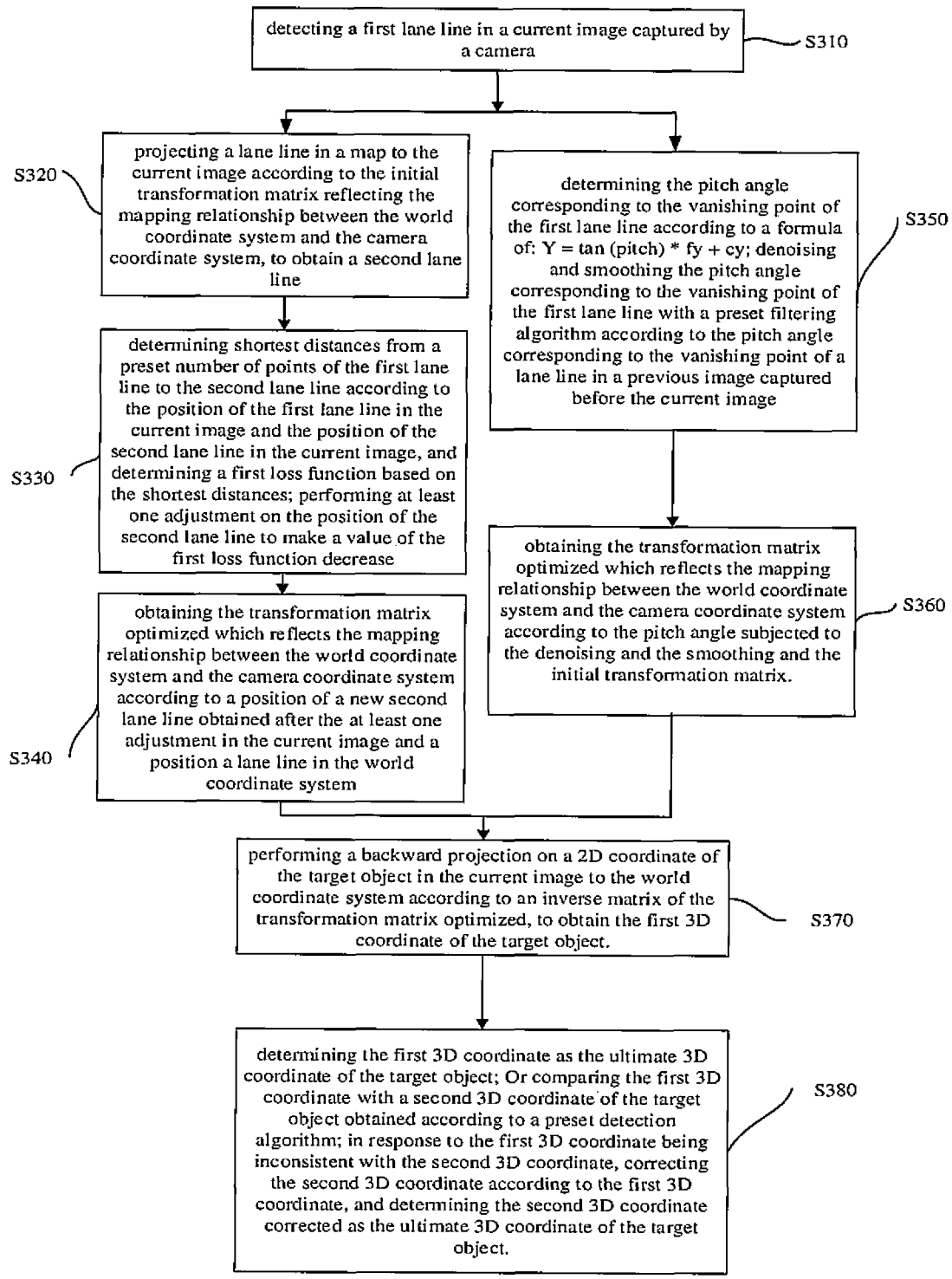
FIG. 3 is a flow chart of another method for position detection according to Embodiment 2 of the present disclosure.

FIG. 3 is a flow chart of another method for position detection according to Embodiment 2 of the present disclosure. As illustrated in FIG. 3, as a further explanation of the above embodiment, the method includes followings.

At block S310, a first lane line in a current image captured by a camera is detected, when a position coordinate of the first lane line is detected, the act at block S320 is executed, and when a pitch angle of a vanishing point of the first lane line, the act at block S350 is executed.

At block S320, a lane line in a map is projected to the current image according to the initial transformation matrix reflecting the mapping relationship between the world coordinate system and the camera coordinate system, to obtain a second lane line.

At block S330, shortest distances from a preset number of points of the first lane line to the second lane line are determined according to the position of the first lane line in the current image and the position of the second lane line in the current image, and a first loss function is determined based on the shortest distances; the at least one adjustment on the position of the second lane line is performed to make a value of the first loss function decrease.

At block S340, the transformation matrix optimized which reflects the mapping relationship between the world coordinate system and the camera coordinate system is obtained according to a position of a new second lane line obtained after the at least one adjustment in the current image and a position a lane line in the world coordinate system.

At block S350, the pitch angle corresponding to the vanishing point of the first lane line is determined according to a formula of: Y=tan(pitch)*fy+cy; the pitch angle corresponding to the vanishing point of the first lane line is denoised and smoothed with a preset filtering algorithm according to the pitch angle corresponding to the vanishing point of a lane line in a previous image captured before the current image.

At block S360, the transformation matrix optimized which reflects the mapping relationship between the world coordinate system and the camera coordinate system is obtained according to the pitch angle subjected to the denoising and the smoothing and the initial transformation matrix.

At block S370, a reverse projection is performed on a 2D coordinate of the target object in the current image to the world coordinate system according to an inverse matrix of the transformation matrix optimized, to obtain the first 3D coordinate of the target object.

At block S380, the first 3D coordinate is determined as the ultimate 3D coordinate of the target object; or the first 3D coordinate is compared with a second 3D coordinate of the target object obtained according to a preset detection algorithm; in response to the first 3D coordinate being inconsistent with the second 3D coordinate, the second 3D coordinate is corrected according to the first 3D coordinate, and the second 3D coordinate corrected is determined as the ultimate 3D coordinate of the target object.

Embodiment 3

Figure 4:
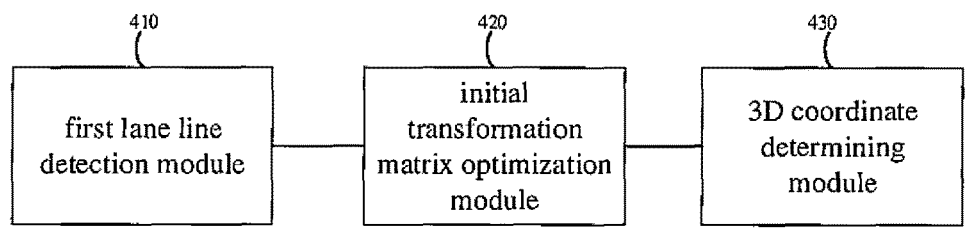
FIG. 4 is a block diagram of an apparatus for position detection according to Embodiment 3 of the present disclosure.

FIG. 4 is a block diagram of an apparatus for position detection according to Embodiment 3 of the present disclosure. The apparatus includes a first lane line detection module 410, an initial transformation matrix optimization module 420 and a 3D coordinate determining module 430.

The first lane line detection module 410 is configured to detect a first lane line in a current image captured by a camera.

The initial transformation matrix optimization module 420 is configured to perform an optimization on an initial transformation matrix reflecting a mapping relationship between a world coordinate system and a camera coordinate system based on a detection result of the first lane line.

The 3D coordinate determining module 430 is configured to obtain a first 3D coordinate of a target object in the current image according to a transformation matrix optimized, and to determine an ultimate 3D coordinate of the target object according to the first 3D coordinate.

Alternatively, the initial transformation matrix optimization module 420 is further configured to: project a lane line in a map to the current image according to the initial transformation matrix reflecting the mapping relationship between the world coordinate system and the camera coordinate system, to obtain a second lane line; and perform the optimization on the initial transformation matrix according to a position of the first lane line in the current image and a position of the second lane line in the current image, to make a distance between a new second lane line obtained by re-projecting the lane line in the map to the current image according to the transformation matrix optimized and the first lane line smaller than a distance between the second lane line and the first lane line.

Alternatively, the initial transformation matrix optimization module 420 is further configured to: determine shortest distances from a preset number of points of the first lane line to the second lane line according to the position of the first lane line in the current image and the position of the second lane line in the current image, and determine a first loss function based on the shortest distances; perform at least one adjustment on the position of the second lane line to make a value of the first loss function decrease; and obtain the transformation matrix optimized which reflects the mapping relationship between the world coordinate system and the camera coordinate system according to a position of a new second lane tine obtained after the at least one adjustment in the current image and a position a lane line in the world coordinate system.

Alternatively, the initial transformation matrix optimization module 420 is further configured to: determine a pitch angle corresponding to a vanishing point of the first lane line, wherein the pitch angle refers to an angle between an optical axis of the camera and a ground plane; and obtain the transformation matrix optimized which reflects the mapping relationship between the world coordinate system and the camera coordinate system according to the pitch angle and the initial transformation matrix.

Alternatively, the initial transformation matrix optimization module 420 is further configured to: denoise and smooth the pitch angle corresponding to the vanishing point of the first lane line with a preset filtering algorithm according to the pitch angle corresponding to the vanishing point of a lane line in a previous image captured before the current image; and obtain the transformation matrix optimized which reflects the mapping relationship between the world coordinate system and the camera coordinate system according to the pitch angle subjected to the denoising and the smoothing and the initial transformation matrix.

Alternatively, the pitch angle is determined corresponding to the vanishing point of the first lane line according to a formula of: Y=tan(pitch)*fy+cy, where Y represents a vertical axis coordinate corresponding to the vanishing point of the first lane line; pitch represents the pitch angle corresponding to the vanishing point of the first lane line; fy represents a focal length of the camera; and cy represents a size of a pixel on a sensor unit of the camera.

Alternatively, the 3D coordinate determining module 430 is further configured to: perform a reverse projection on a 2D coordinate of the target object in the current image to the world coordinate system according to an inverse matrix of the transformation matrix optimized, to obtain the first 3D coordinate of the target object.

Alternatively, the 3D coordinate determining module 430 is further configured to: determine the first 3D coordinate as the ultimate 3D coordinate of the target object; or compare the first 3D coordinate with a second 3D coordinate of the target object obtained according to a preset detection algorithm; in response to the first 3D coordinate being inconsistent with the second 3D coordinate, correct the second 3D coordinate according to the first 3D coordinate, and determine the second 3D coordinate corrected as the ultimate 3D coordinate of the target object.

Alternatively, the 3D coordinate determining module 430 is further configured to: determine a second loss function based on a difference between the second 3D coordinate and the first 3D coordinate; perform the at least one adjustment on the second 3D coordinate to make a value of the second loss function decrease; and determine the second 3D coordinate obtained after the at least one adjustment as the ultimate 3D coordinate of the target object.

Alternatively, the apparatus further includes a positioning element 3D position coordinate obtaining module, an adjustment module.

The positioning element 3D position coordinate obtaining module is configured to obtain a 3D position coordinate of a positioning element in the current image after each adjustment for the second 3D coordinate; in response to a distance between the positioning element and the camera being greater than a distance between the target object and the camera, determine whether the second 3D coordinate after the adjustment is smaller than the 3D position coordinate of the positioning element, in which, if the second 3D coordinate after the adjustment is smaller than the 3D position coordinate of the positioning element, the adjustment is valid; otherwise, the adjustment is invalid, and a reverse adjustment is performed on the second 3D coordinate.

The adjustment module is configured to, in response to the distance between the positioning element and the camera being smaller than the distance between the target object and the camera, determine whether the second 3D coordinate after the adjustment is greater than the 3D position coordinate of the positioning element, in which, if the adjustment is greater than the 3D position coordinate of the positioning element, the adjustment is valid; otherwise, the adjustment is invalid, and the reverse adjustment is performed on the second 3D coordinate.

Alternatively, the positioning element includes at least one of a traffic sign, a street light, and a telephone pole.

The apparatus may execute the methods provided by all of the embodiments of the present disclosure, and has corresponding modules and advantageous effects for executing the methods. For those technical details not described in detail in the embodiment, the methods provided by all of the embodiments of the present disclosure may be referred to.

Embodiment 4

Figure 5:
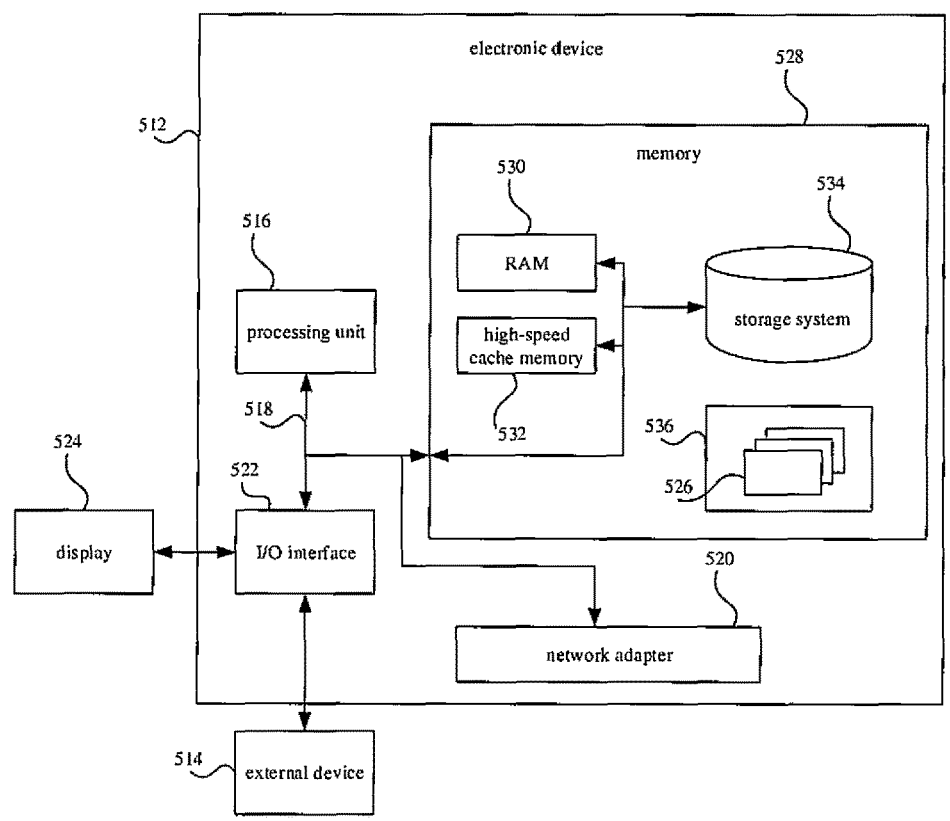
FIG. 5 is a block diagram of an electronic device according to Embodiment 4 of the present disclosure.

FIG. 5 is a block diagram of an electronic device according to a fourth embodiment of the present disclosure. FIG. 5 is a block diagram of a device 512 for implementing embodiments of the present disclosure. The device 512 illustrated in FIG. 5 is only illustrated as an example, and should not be considered as any restriction on the function and the usage range of embodiments of the present disclosure.

As illustrated in FIG. 5, the device 512 is in the form of a general-purpose computing apparatus. The device 512 may include, but is not limited to, one or more processors or processing units 516, a system memory 528, and a bus 518 connecting different system components (including the system memory 528 and the processing unit 516).

The bus 518 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the device 512 may include multiple kinds of computer-readable media. These media may be any storage media accessible by the device 512, including transitory or non-transitory storage medium and movable or unmovable storage medium.

The memory 528 may include a computer-readable medium in a form of volatile memory, such as a random access memory (RAM) 530 and/or a high-speed cache memory 532. The device 512 may further include other transitory/non-transitory storage media and movable/unmovable storage media. In way of example only, the storage system 534 may be used to read and write non-removable, non-volatile magnetic media (not shown in the figure, commonly referred to as "hard disk drives"). Although not illustrated in FIG. 5, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 518 via one or more data medium interfaces. The memory 528 may include at least one program product, which has a set of (for example at least one) program modules configured to perform the functions of embodiments of the present disclosure.

A program/application 536 with a set of (at least one) program modules 526 may be stored in memory 528, the program modules 526 may include, but not limit to, an operating system, one or more application programs, other program modules and program data, and any one or combination of above examples may include an implementation in a network environment. The program modules 526 are generally configured to implement functions and/or methods described in embodiments of the present disclosure.

The device 512 may also communicate with one or more external devices 514 (e.g., a keyboard, a pointing device, a display 524, and etc.) and may also communicate with one or more devices that enables a user to interact with the computer system/server 512, and/or any device (e.g., a network card, a modem, and etc.) that enables the computer system/server 512 to communicate with one or more other computing devices. This kind of communication can be achieved by the input/output (I/O) interface 522. In addition, the device 512 may be connected to and communicate with one or more networks such as a local area network (LAN), a wide area network (WAN) and/or a public network such as the Internet through a network adapter 520. As shown in FIG. 5, the network adapter 520 communicates with other modules of the device 512 over bus 518. It should be understood that although not shown in the figure, other hardware and/or software modules may be used in combination with the device 512, which including, but not limited to, microcode, device drivers, redundant processing units, external disk drive arrays, Redundant Arrays of Independent Disks (RAID) systems, tape drives, as well as data backup storage systems and the like.

The processing unit 516 may perform various functional applications and data processing by running programs stored in the system memory 528, for example, to perform the method for position detection provided by embodiments of the present disclosure.

Embodiment 5

A fifth embodiment of the present disclosure provides a computer readable storage medium, stored thereon with computer programs that, when executed by a processor, configured to perform the method for position detection according to embodiments of the present disclosure.

Of course, the computer programs stored on the computer readable storage medium provided by embodiments of the present disclosure are not limited to execute the method described above and may execute related operations in the method provided by any of embodiments of the present disclosure.

The above storage medium including the computer executable instructions may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media includes (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

Figure 6:
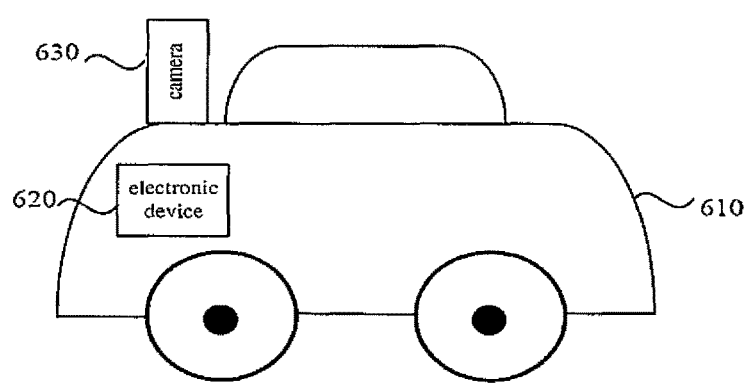
FIG. 6 is a schematic diagram of a vehicle according to Embodiment 5 of the present disclosure.

Further, FIG. 6 is a schematic diagram of a vehicle according to Embodiment 5 of the present disclosure. As illustrated in FIG. 6, the vehicle includes a vehicle body 610, an electronic device 620 according to the above embodiments, and a camera 630 configured on the vehicle body.

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for position detection, comprising:
    detecting a first lane line in a current image captured by a camera;
    performing an optimization on an initial transformation matrix reflecting a mapping relationship between a world coordinate system and a camera coordinate system based on a detection result of the first lane line wherein a pitch angle corresponding to a vanishing point of the first lane line is determined, and wherein the pitch angle refers to an angle between an optical axis of the camera and a ground plane; and
    obtaining a transformation matrix optimized which reflects the mapping relationship between the world coordinate system and the camera coordinate system according to the pitch angle and the initial transformation matrix; and
    obtaining a first 3D coordinate of a target object in the current image according to the transformation matrix optimized, and determining an ultimate 3D coordinate of the target object according to the first 3D coordinate.

2. The method of claim 1, wherein performing the optimization on the initial transformation matrix reflecting the mapping relationship between the world coordinate system and the camera coordinate system based on the detection result of the first lane line comprises:
    projecting a lane line in a map to the current image according to the initial transformation matrix reflecting the mapping relationship between the world coordinate system and the camera coordinate system, to obtain a second lane line; and
    performing the optimization on the initial transformation matrix according to a position of the first lane line in the current image and a position of the second lane line in the current image, to make a distance between a new second lane line obtained by re-projecting the lane line in the map to the current image according to the transformation matrix optimized and the first lane line smaller than a distance between the second lane line and the first lane line.

3. The method of claim 2, wherein performing the optimization on the initial transformation matrix according to the position of the first lane line in the current image and the position of the second lane line in the current image comprises:
  determining shortest distances from a preset number of points of the first lane line to the second lane line according to the position of the first lane line in the current image and the position of the second lane line in the current image, and determining a first loss function based on the shortest distances;
  performing at least one adjustment on the position of the second lane line to make a value of the first loss function decrease; and
  obtaining the transformation matrix optimized which reflects the mapping relationship between the world coordinate system and the camera coordinate system according to a position of a new second lane line obtained after the at least one adjustment in the current image and a position a lane line in the world coordinate system.

4. The method of claim 1, wherein obtaining the transformation matrix optimized which reflects the mapping relationship between the world coordinate system and the camera coordinate system according to the pitch angle and the initial transformation matrix comprises:
  denoising and smoothing the pitch angle corresponding to the vanishing point of the first lane line with a preset filtering algorithm according to the pitch angle corresponding to the vanishing point of a lane line in a previous image captured before the current image; and
  obtaining the transformation matrix optimized which reflects the mapping relationship between the world coordinate system and the camera coordinate system according to the pitch angle subjected to the denoising and the smoothing and the initial transformation matrix.

5. The method of claim 1, comprising:
determining the pitch angle corresponding to the vanishing point of the first lane line according to a formula of:

$$Y=\tan(pitch)*fy+cy;$$

where Y represents a vertical axis coordinate corresponding to the vanishing point of the first lane line; pitch represents the pitch angle corresponding to the vanishing point of the first lane line; fy represents a focal length of the camera; and cy represents a size of a pixel on a sensor unit of the camera.

6. The method of claim 1, wherein obtaining the first 3D coordinate of the target object in the current image according to the transformation matrix optimized comprises:
  performing a reverse projection on a 2D coordinate of the target object in the current image to the world coordinate system according to an inverse matrix of the transformation matrix optimized, to obtain the first 3D coordinate of the target object.

7. The method of claim 1, wherein determining the ultimate 3D coordinate of the target object according to the first 3D coordinate comprises at least one of:
  determining the first 3D coordinate as the ultimate 3D coordinate of the target object; and
  comparing the first 3D coordinate with a second 3D coordinate of the target object obtained according to a preset detection algorithm; in response to the first 3D coordinate being inconsistent with the second 3D coordinate, correcting the second 3D coordinate according to the first 3D coordinate, and determining the second 3D coordinate corrected as the ultimate 3D coordinate of the target object.

8. The method of claim 7, wherein correcting the second 3D coordinate according to the first 3D coordinate, and taking the second 3D coordinate corrected as the ultimate 3D coordinate of the target object comprises:
  determining a second loss function based on a difference between the second 3D coordinate and the first 3D coordinate;
  performing the at least one adjustment on the second 3D coordinate to make a value of the second loss function decrease; and
  determining the second 3D coordinate obtained after the at least one adjustment as the ultimate 3D coordinate of the target object.

9. The method of claim 8, comprising:
  obtaining a 3D position coordinate of a positioning element in the current image after each adjustment for the second 3D coordinate;
  in response to a distance between the positioning element and the camera being greater than a distance between the target object and the camera, determining whether the second 3D coordinate after the adjustment is smaller than the 3D position coordinate of the positioning element, in which, if the second 3D coordinate after the adjustment is smaller than the 3D position coordinate of the positioning element, the adjustment is valid; otherwise, the adjustment is invalid, and a reverse adjustment is performed on the second 3D coordinate; and
  in response to the distance between the positioning element and the camera being smaller than the distance between the target object and the camera, determining whether the second 3D coordinate after the adjustment is greater than the 3D position coordinate of the positioning element, in which, if the adjustment is greater than the 3D position coordinate of the positioning element, the adjustment is valid; otherwise, the adjustment is invalid, and the reverse adjustment is performed on the second 3D coordinate.

10. The method of claim 8, wherein the positioning element comprises at least one of a traffic sign, a street light, and a telephone pole.

11. An electronic device, comprising:
a memory, a processor; and
computer programs stored in the memory and executable by the processor,
wherein when the processor executes the computer programs, a method for position detection is performed, and the method comprises:
  detecting a first lane line in a current image captured by a camera;
  performing an optimization on an initial transformation matrix reflecting a mapping relationship between a world coordinate system and a camera coordinate system based on a detection result of the first lane line wherein a pitch angle corresponding to a vanishing point of the first lane line is determined, and wherein the pitch angle refers to an angle between an optical axis of the camera and a ground plane; and obtaining a transformation matrix optimized which reflects the mapping relationship between the world coordinate system and the camera coordinate system according to the pitch angle and the initial transformation matrix; and obtaining a first 3D coordinate of a target object in the current image according to the transformation matrix optimized, and determining an ultimate 3D coordinate of the target object according to the first 3D coordinate.

12. The electronic device of claim 11, wherein the processor performs the optimization on the initial transformation matrix reflecting the mapping relationship between the world coordinate system and the camera coordinate system based on the detection result of the first lane line by performing acts of:

projecting a lane line in a map to the current image according to the initial transformation matrix reflecting the mapping relationship between the world coordinate system and the camera coordinate system, to obtain a second lane line; and performing the optimization on the initial transformation matrix according to a position of the first lane line in the current image and a position of the second lane line in the current image, to make a distance between a new second lane line obtained by re-projecting the lane line in the map to the current image according to the transformation matrix optimized and the first lane line smaller than a distance between the second lane line and the first lane line.

13. The electronic device of claim 12, wherein the processor performs the optimization on the initial transformation matrix according to the position of the first lane line in the current image and the position of the second lane line in the current image by performing acts of:

determining shortest distances from a preset number of points of the first lane line to the second lane line according to the position of the first lane line in the current image and the position of the second lane line in the current image, and determining a first loss function based on the shortest distances;

performing at least one adjustment on the position of the second lane line to make a value of the first loss function decrease; and obtaining the transformation matrix optimized which reflects the mapping relationship between the world coordinate system and the camera coordinate system according to a position of a new second lane line obtained after the at least one adjustment in the current image and a position a lane line in the world coordinate system.

14. The electronic device of claim 11, wherein the processor performs an optimization on an initial transformation matrix reflecting a mapping relationship between the world coordinate system and the camera coordinate system based on the detection result of the first lane line by performing acts of:

determining a pitch angle corresponding to a vanishing point of the first lane line, wherein the pitch angle refers to an angle between an optical axis of the camera and a ground plane; and obtaining the transformation matrix optimized which reflects the mapping relationship between the world coordinate system and the camera coordinate system according to the pitch angle and the initial transformation matrix.

15. The electronic device of claim 14, wherein the processor obtains the transformation matrix optimized which reflects the mapping relationship between the world coordinate system and the camera coordinate system according to the pitch angle and the initial transformation matrix by performing acts of:

denoising and smoothing the pitch angle corresponding to the vanishing point of the first lane line with a preset filtering algorithm according to the pitch angle corresponding to the vanishing point of a lane line in a previous image captured before the current image; and obtaining the transformation matrix optimized which reflects the mapping relationship between the world coordinate system and the camera coordinate system according to the pitch angle subjected to the denoising and the smoothing and the initial transformation matrix.

16. The electronic device of claim 14, wherein the processor is configured to: determine the pitch angle corresponding to the vanishing point of the first lane line according to a formula of:

$$Y=\tan(\text{pitch})*fy+cy;$$

where Y represents a vertical axis coordinate corresponding to the vanishing point of the first lane line; pitch represents the pitch angle corresponding to the vanishing point of the first lane line; fy represents a focal length of the camera; and cy represents a size of a pixel on a sensor unit of the camera.

17. The electronic device of claim 11, wherein the processor obtains the first 3D coordinate of the target object in the current image according to the transformation matrix optimized by performing an act of:

performing a reverse projection on a 2D coordinate of the target object in the current image to the world coordinate system according to an inverse matrix of the transformation matrix optimized, to obtain the first 3D coordinate of the target object.

18. The electronic device of claim 11, wherein the processor determines the ultimate 3D coordinate of the target object according to the first 3D coordinate by performing at least one act of:

determining the first 3D coordinate as the ultimate 3D coordinate of the target object; and comparing the first 3D coordinate with a second 3D coordinate of the target object obtained according to a preset detection algorithm; in response to the first 3D coordinate being inconsistent with the second 3D coordinate, correcting the second 3D coordinate according to the first 3D coordinate, and determining the second 3D coordinate corrected as the ultimate 3D coordinate of the target object.

19. A non-transitory computer readable storage medium, storing computer programs thereon, wherein when the computer programs are executed by a processor, a method for position detection is performed, and the method comprises:

detecting a first lane line in a current image captured by a camera;

performing an optimization on an initial transformation matrix reflecting a mapping relationship between a world coordinate system and a camera coordinate system based on a detection result of the first lane line wherein a pitch angle corresponding to a vanishing point of the first lane line is determined, and wherein the pitch angle refers to an angle between an optical axis of the camera and a ground plane; and obtaining a transformation matrix optimized which reflects the mapping relationship between the world coordinate system and the camera coordinate system according to the pitch angle and the initial transformation matrix; and obtaining a first 3D coordinate of a target object in the current image according to the transformation matrix optimized, and determining an ultimate 3D coordinate of the target object according to the first 3D coordinate.

\* \* \* \* \*